Aug. 22, 1950   J. H. WERNIG ET AL   2,520,074
FRONT CONSTRUCTION FOR AUTOMOBILE STEEL BODIES

Filed Dec. 23, 1946   5 Sheets-Sheet 1

INVENTOR.
James H. Wernig
& Albert A. Cripps
BY
Barnes, Kisselle, Laughlin & Raisch
ATTORNEYS.

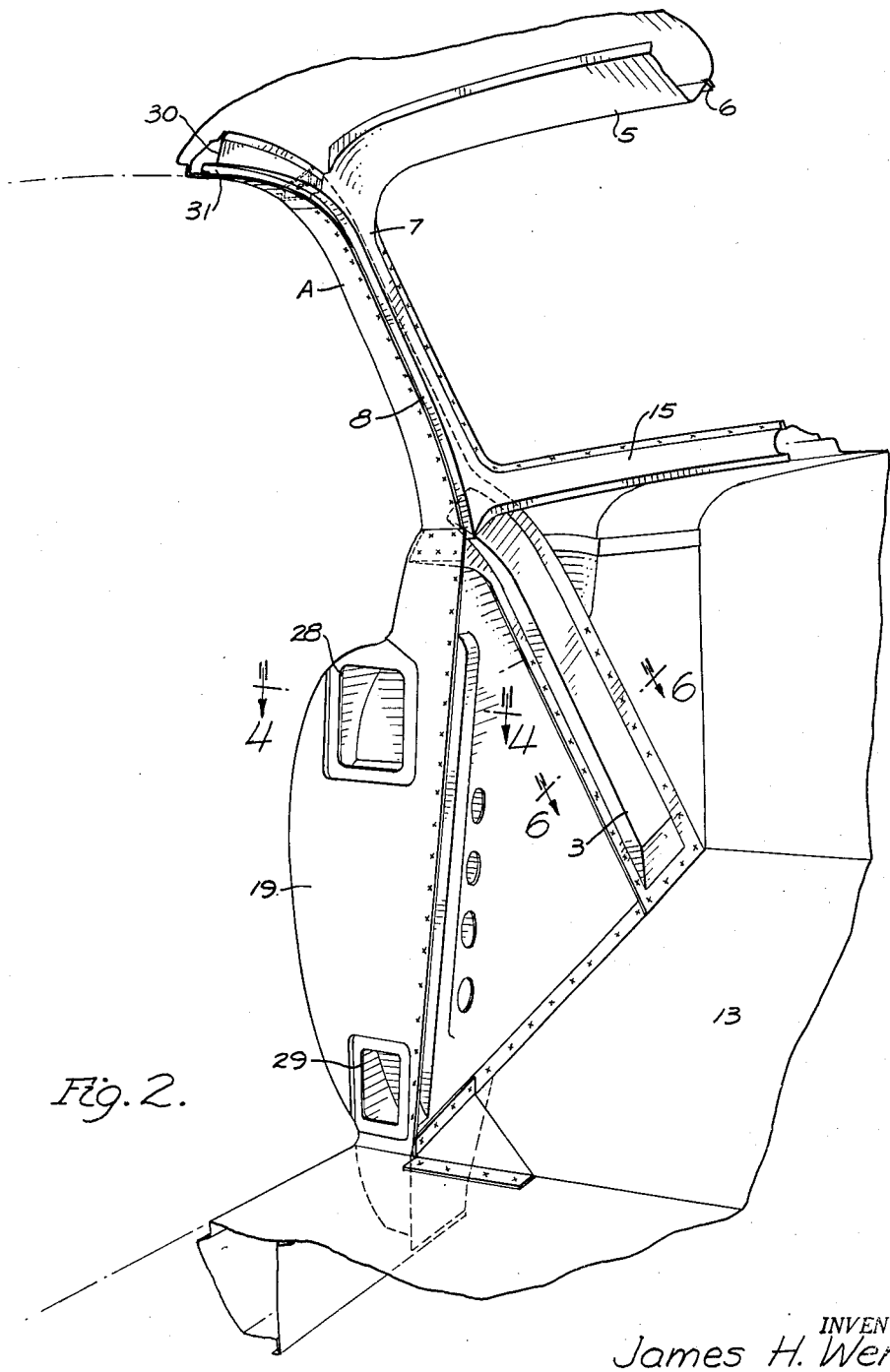

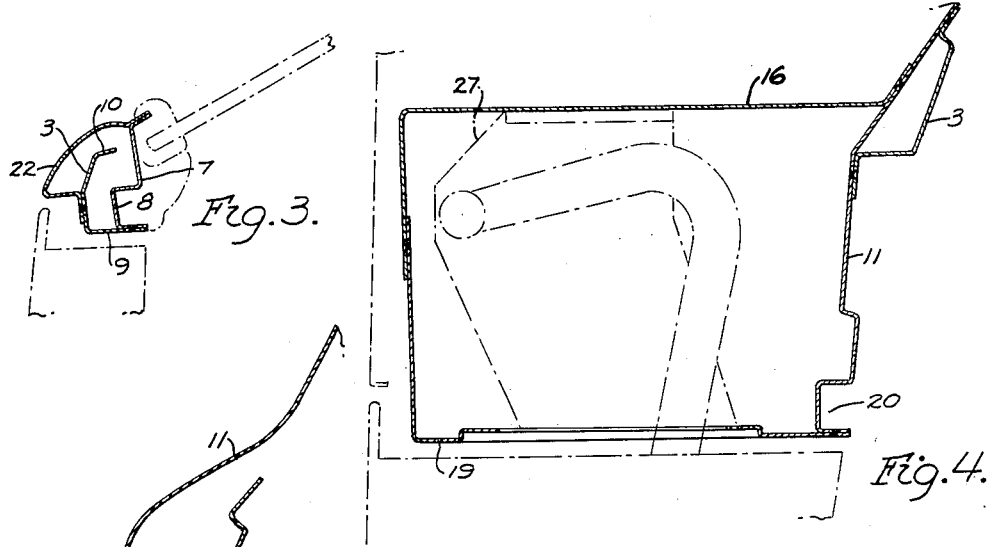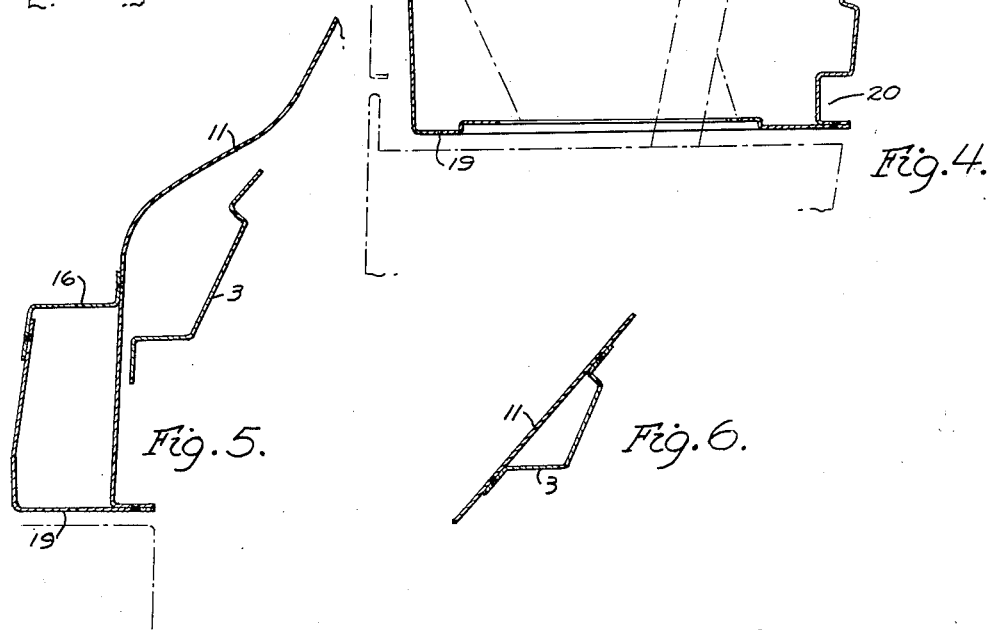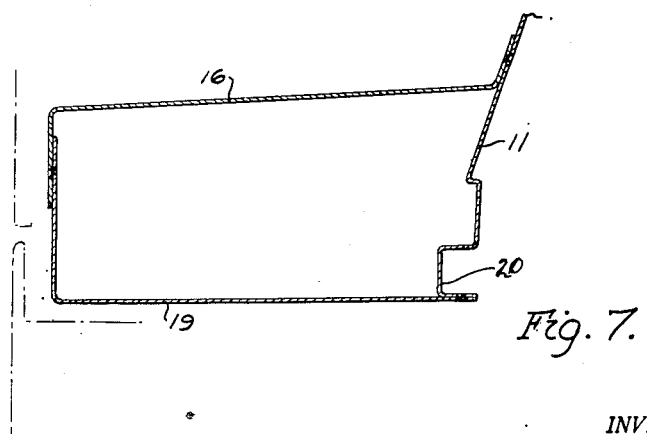

Aug. 22, 1950     J. H. WERNIG ET AL     2,520,074
FRONT CONSTRUCTION FOR AUTOMOBILE STEEL BODIES

Filed Dec. 23, 1946     5 Sheets-Sheet 4

INVENTOR.
James H. Wernig
& Albert A. Cripps
BY
Barnes, Kisselle, Laughlin & Raisch
ATTORNEYS.

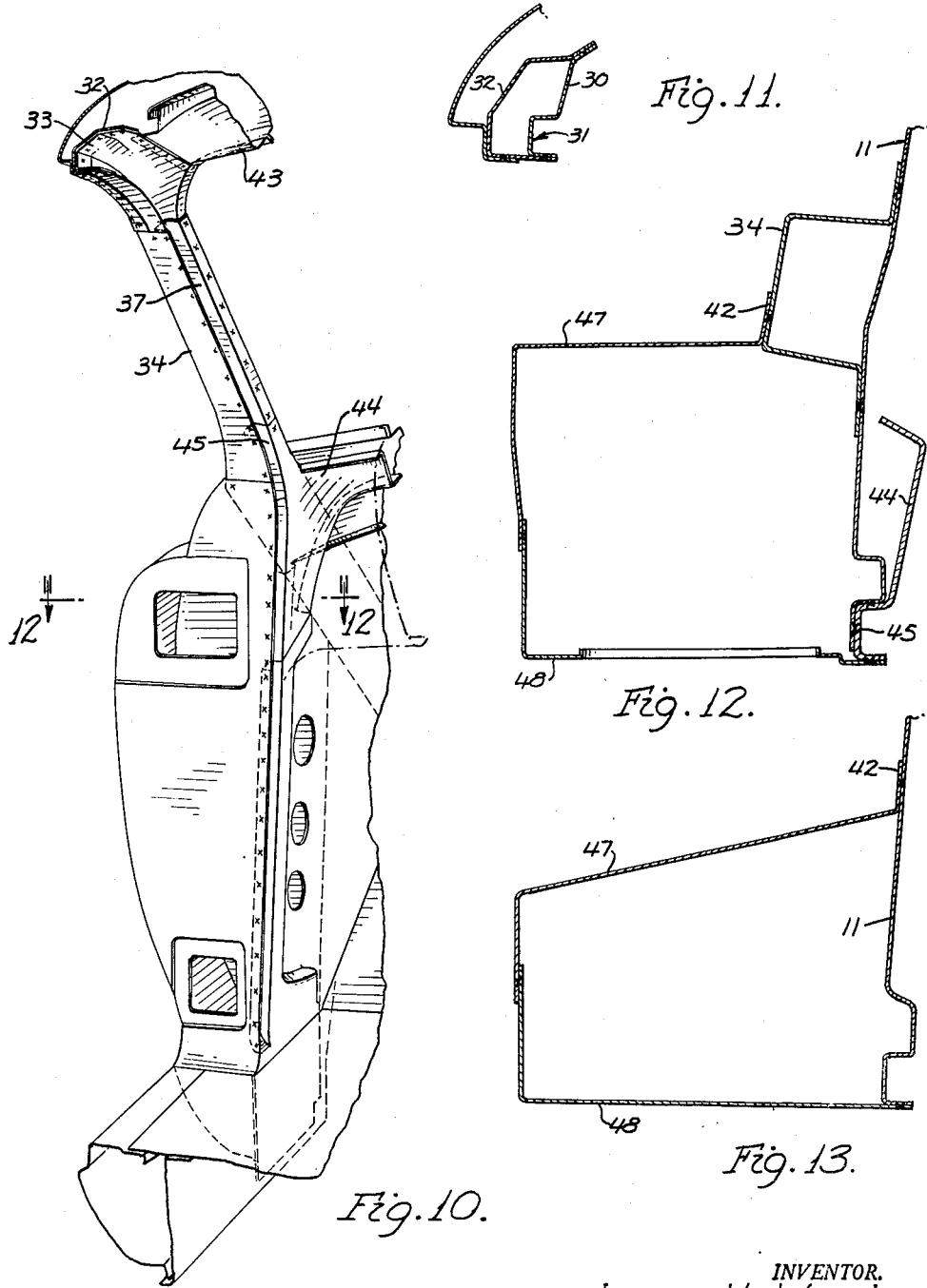

Patented Aug. 22, 1950

2,520,074

UNITED STATES PATENT OFFICE 2,520,074

FRONT CONSTRUCTION FOR AUTOMOBILE STEEL BODIES

James H. Wernig and Albert A. Cripps, Detroit, Mich., assignors to General Motors Corporation, Detroit, Mich., a corporation of Delaware Application December 23, 1946, Serial No. 717,870

7 Claims. (Cl. 296—28)

This invention relates to the front end construction of automobile steel bodies. It is particularly directed to the windshield pillar and the side truss reinforcements for the length of the body.

The object of this invention is to provide a sheet metal body for automobiles which is strengthened by an arch or truss structure at the front and at the same time has a vertical pillar below the belt line which forms the jamb face of the door and at the same time provides a support for the door hinges. This A pillar affords the bulging streamlined effect that is now in vogue. The front structure is formed by bringing an extension of the roof rail panel down through the upper windshield pillar in which it forms one panel of the upper windshield pillar; thence this strip continues down and forms an oblique reinforcing channel that is welded to the inside face of the side shroud panel. The hinge pillar is in the form of a flanged channel that is erected on the outside of the shroud panel. This channel windshield pillar gradually swells out or increases its depth from a line somewhat below the belt line. This gives the contour and body swelling and streamlining that is the fashion today.

Referring to the drawings:

Fig. 2 is a fragmentary perspective of the same parts viewed from the inside of the body.

Fig. 3 is a section on the line 3—3 of Fig. 1.

Fig. 4 is a section on the line 4—4 of Fig. 2.

Fig. 5 is a section on the line 5—5 of Fig. 1.

Fig. 6 is a section on the line 6—6 of Fig. 2.

Fig. 7 is a section on the line 7—7 of Fig. 1.

Fig. 10 is a fragmentary perspective viewed from the inside of the body of the same form of our invention as is shown in Fig. 8.

Fig. 11 is a section on the line 11—11 of Fig. 8.

Fig. 12 is a section on the line 12—12 of Fig. 10.

Fig. 13 is a section on the line 13—13 of Fig. 8.

Figure 1:
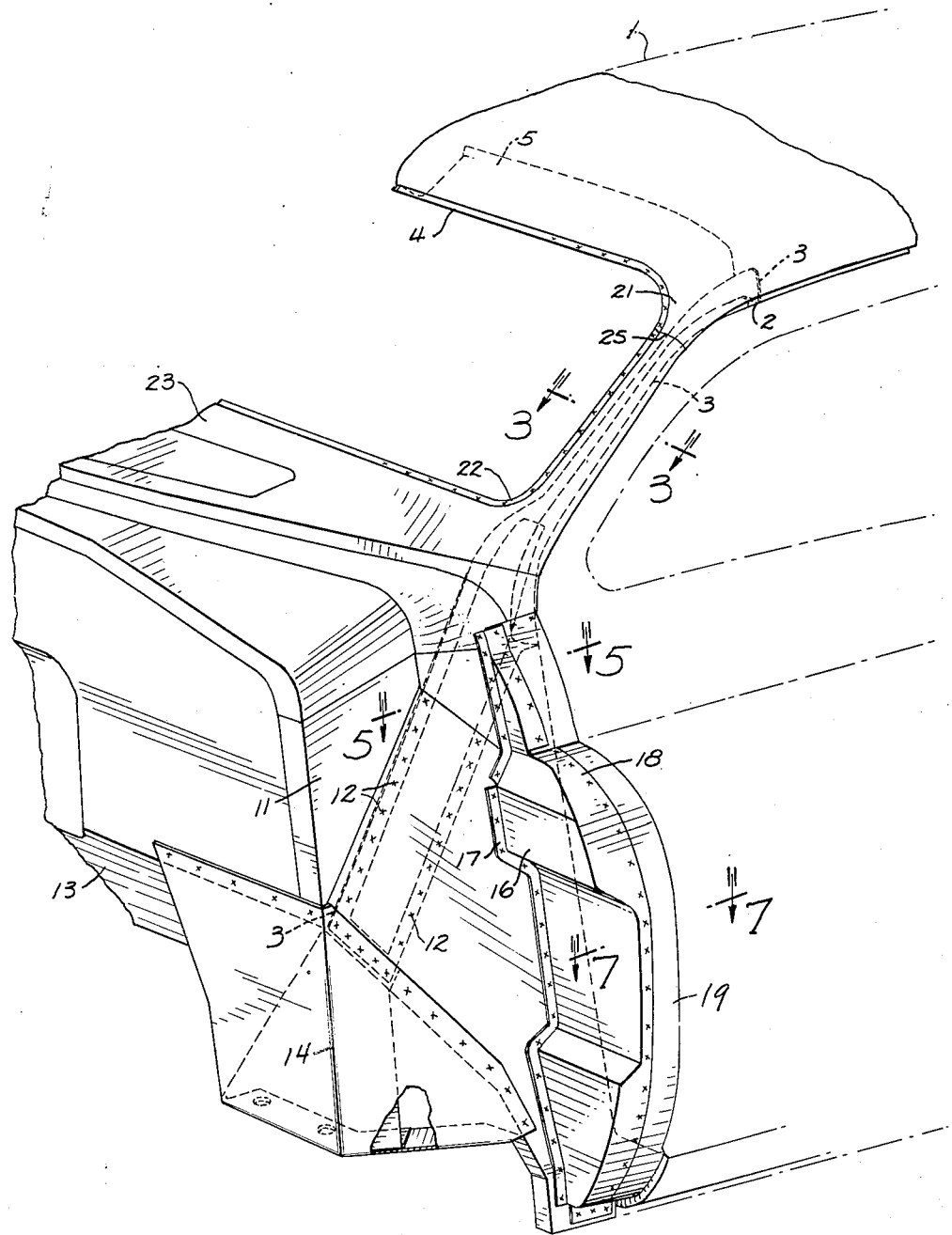
Fig. 1 is a fragmentary perspective of the front of a body embodying one form of our improvement.
Figure 8:
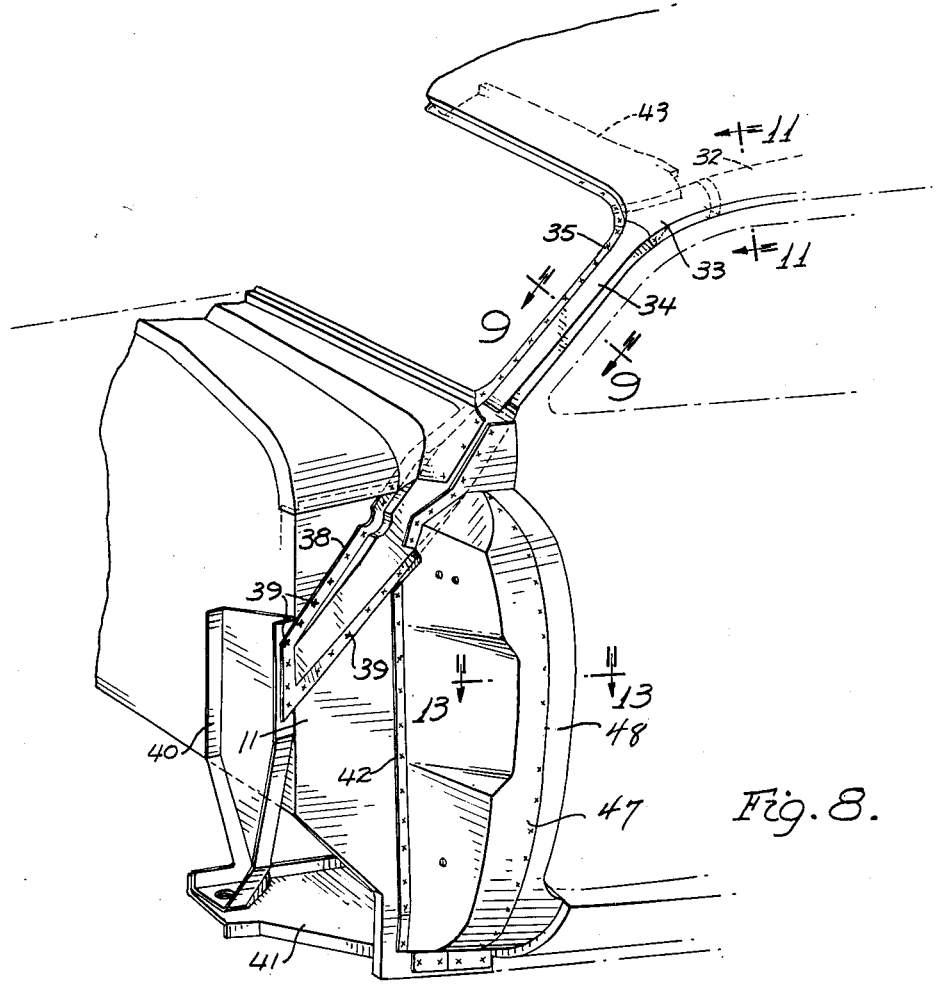
Fig. 8 is a fragmentary perspective of another form of our invention.
Figure 9:
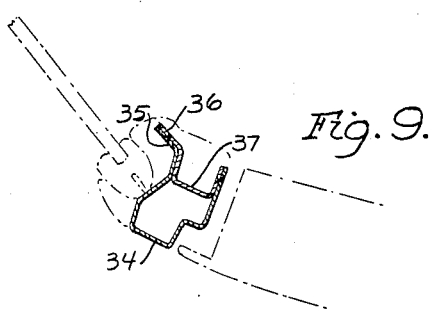
Fig. 9 is a section on the line 9—9 of Fig. 8.

Referring to Fig. 1, 1 designates the roof panel which is turned over at the sides and lap welded at point 2 to the side roof rail panel 3. The front of the roof panel has a turned-out flange 4 which is pinch welded to a turned-out flange on the windshield header 5, as at point 6 in Fig. 2. This header is part of the inner windshield frame, the side members of which, designated 7, form the inner panel of the A pillar or windshield pillar A. This inside panel of the windshield pillar is shown in cross section in Fig. 3 and includes a weld recess and wire carrying groove 8 which could contain a paper or wooden tacking strip. The outer flange of this groove is lapped with the jamb member 9 of the L-section strip which is a continuation of the roof rail panel 3. Compare the member 3 as shown in dotted lines in Fig. 1 with the member 3 shown in section in Fig. 3. This single side rail of the body forms a part of the roof rail, forms the jamb face 9 of the door and forms a free flange 10 inside the windshield pillar that acts as a reinforcement of the pillar.

Now compare Fig. 5. This side rail extends down below the belt line of the body obliquely forward, as shown in Fig. 1, and at substantially the same angularity in general as the upper windshield pillar. In Fig. 5 the member 3 is a shallow outwardly-flanged channel strip which is spaced from the adjacent body parts. However, right below the place where section 5—5 is taken the flanges contact the inside of the shroud side panel 11 and are spot welded thereto at the spots 12. The side rail ends at the toeboard 13, being spot welded at this point to the shroud side panel and also to the corner reinforcing bracket 14. This side rail, therefore, becomes not only a brace for the upper windshield pillar but traveling as it does along the side of the body as part of the roof rail it becomes a longitudinally extending arch to strengthen the whole body from front to rear. When it is considered that these side rails are united at the front by the upper windshield header 5 and are united below the roof panel by means of metal cross bows (not shown) it will be understood that this whole structure—the two side rails and the cross members—forms a powerful arch-type truss from the front of the car rearwardly and may be supplemented by an arched structure (not shown) at the rear of the body. This makes for an unusually strong and sturdy body.

The front hinge pillar is an entirely separate independent member that is built onto the shroud, as shown particularly in Fig. 1. It comprises a stamping 16 that has forward flanges 17 which are spot welded to the outside of the shroud panel and a rear flange 18 which is spot welded to an L-section stamping 19. This stamping is at its inside lapped over the wall of the groove 20 which is intended for easier welding (Fig. 7) of the shroud panel 11 and is spot welded thereto. This forms a deep channel for the hinge pillar that matches the contour of the forward fenders (not shown) and hood panel (not shown) of the wide streamlined bodies that are now in fashion.

The outside of the upper windshield pillar is formed by the forwardly extending stub pillar covers 21 which are part of the roof panel stamping and the upwardly extending pillar covers 22 which are part of the upper shroud stamping 23. Pillar covers 22 are gas or arc welded at seams 25 to the roof panel stubs or pillar covers 21.

The concealed hinge brackets 27 are supported in place in the channelled hinge pillar, as shown in Fig. 4. The openings 28 and 29 (see Fig. 2) are for the upper and lower concealed hinges.

The roof side rail is provided with an inside panel 30 (Fig. 2) provided with a windlace strip retaining groove and weld recess 31. This affords a roof rail which is a box-like section and relatively strong to complete the strong arches at the sides of the body, referred to hereinbefore as a part of the general truss construction which extends from front to rear of the body.

A modification of this structure is shown in Figs. 8 to 13, inclusive. In this structure the outer roof rail member 32 (Fig. 10) is united by a corner bracket 33 with a windshield pillar panel 34. This panel has a flange at the front edge 35 (Fig. 9) which is matched with flanges 36 on the inside panel 37 of the windshield pillar to form the pinch weld flange in the side of the windshield opening. The pillar member 34 widens (Fig. 8) and outwardly flanged at 38 to form flanges that overlie the outside of the shroud side panel 11 and are spot welded thereto at spots 39. In this form of the body the forwardly extending rail member does not extend to the toeboard but to a reinforcing bracket 40 which is supported on a platform 41 extending forward from the floor pan of the body.

The hinge pillar is a channel member built up of two sections or L-section stampings 47 and 48 (see Figs. 12 and 13). These are welded together and the forward stamping has an outturned flange 42 which is welded at the section line 12—12 to the rail 34 and below this rail is welded to the shroud panel 11. This structure differs generally from the modification shown in Figs. 1 to 7, inclusive, by the inner windshield frame being made up of separate pieces. The top header 43 is secured to the corner bracket 33 by welding. The outside windshield pillar, while a continuation of the roof rail outer panel, is separate therefrom and united therewith by the bracket 33. The windshield side rail extends down over the shroud side panel on the outside instead of on the inside, as in Figs. 1 to 7, inclusive. Both the constructions, however, embody the idea of extending the roof rail panel forwardly to form one part of the upper windshield pillar and then obliquely forward from the lower portion of the windshield opening to form a complete longitudinal arch for the side reinforcement of the body. The front hinge pillar is an independently constructed member built out from the shroud panel as a reinforcing arch for the purpose of giving support and contour for the fenders and the hood and for supporting the hinges.

It will be noted, by comparing Figs. 10 and 12, that a strong inner lower windshield corner reinforcement is afforded by the plate 44 which for part of the distance from top to bottom of the pillar forms a weld recess and wire carrying groove 45. The roof rail has in this modification an inner panel 30 which affords a box section roof rail (see Fig. 11).

We claim:

1. A front construction including a hollow windshield pillar for sheet metal bodies, having in combination a shroud side panel, a side rail including a roof rail panel and a forwardly and downwardly inclined extension thereof forming a panel of the upper windshield pillar, a panel secured to said extension to complete the upper windshield pillar, one of the panels forming the windshield pillar extending downwardly and forwardly below the windshield and secured to a face of the shroud side panel to complete an arch at the front of the body extending from the front of the body upwardly along the shroud panel, thence through the inclined windshield pillar and rearwardly through the side roof rail.

2. A front construction including the windshield pillar for sheet metal bodies, having in combination a shroud side panel, a side rail including a roof rail panel and a forwardly and downwardly inclined extension thereof forming a panel of the upper windshield pillar, one or more other panels secured to said extension to complete the upper windshield pillar, one of the panels forming the windshield pillar extending downwardly and forwardly below the windshield and secured along a face of the shroud panel to complete an arch at the front of the body extending from the front of the body upwardly along the shroud panel, thence through the inclined windshield pillar and rearwardly through the side roof rail, and a hinge pillar of channel section built on the outside of the shroud side panel below the base of the upper windshield pillar and complementing said windshield pillar in outlining the door opening.

3. A front construction including the windshield pillar for sheet metal bodies, having in combination a shroud side panel, a side rail including a roof rail panel and a forwardly and downwardly inclined extension thereof forming a panel of the upper windshield pillar, one or more other panels secured to said extension to complete the upper windshield pillar, one of the panels forming the windshield pillar extending downwardly and forwardly below the windshield and secured to the shroud panel to complete an arch at the front of the body extending from the front of the body upwardly along the shroud panel, thence through the inclined windshield pillar and rearwardly through the side roof rail, and a hinge pillar of two L-section stampings welded together and to the shroud side panel to form a channel section hinge pillar below the base of the upper windshield pillar and complementing said windshield pillar in forming the front pillar for the door opening.

4. A front construction including a hollow windshield or A pillar for sheet metal bodies, having in combination a shroud side panel, a side rail extending along the side to form part of the roof rail, thence downwardly and forwardly to form the jamb face of the door opening and a reinforcing flange inside the windshield pillar, and an inside windshield pillar panel secured to the downward extension of the side rail to complete the upper windshield pillar, said side rail extension then continuing in channel cross section downwardly and forwardly along a face of the shroud side panel and secured thereto.

5. A front construction including the windshield or A pillar for sheet metal bodies, having in combination a shroud side panel, a side rail of channel cross section extending along the side to form part of the roof rail, thence downwardly and forwardly to form the jamb face of the door opening and a reinforcing flange inside the windshield pillar, pillar covers and inside windshield pillar panel secured to the downward extension of the side rail to complete the upper windshield pillar, said side rail extension then continuing in channel cross section and downwardly and forwardly along the inside of the shroud side panel and secured thereto.

6. A front construction including a hollow windshield or A pillar for sheet metal bodies, having in combination a shroud side panel, a side rail extending along the side to form part of the roof rail, thence downwardly and forwardly to form the jamb face of the door opening and a free reinforcing flange inside the windshield pillar, pillar covers and inside windshield pillar panel secured to the downward extension of the side rail to complete the upper windshield pillar, said side rail extension then continuing in channel cross section and downwardly and forwardly along the face of the shroud side panel and secured thereto, and an independent deep channel section hinge pillar erected on the outside of the shroud panel to give contour to the side of the body and support the door hinges and complement the hollow windshield pillar in forming the front pillar of the door opening.

7. A front construction including the windshield or A pillar for sheet metal bodies having in combination a shroud side panel, a side rail of channel cross section extending along the side to form part of the roof rail, thence downwardly and forwardly to form the jamb face of the door opening and a reinforcing flange inside the windshield pillar, pillar covers and inside windshield pillar panel secured to the downward side rail extension to complete the upper windshield pillar, said extension then continuing in channel cross section and downwardly and forwardly along the inside of the shroud side panel and secured thereto, and an independent deep channel section hinge pillar erected on the outside of the shroud panel to give contour to the side of the body and support the door hinges.

JAMES H. WERNIG.
ALBERT A. CRIPPS.

REFERENCES CITED

The following references are of record in the file of this patent:

UNITED STATES PATENTS

| Number | Name | Date |
| --- | --- | --- |
| 1,874,763 | Kubler | Aug. 30, 1932 |
| 2,082,830 | Haberstump | June 8, 1937 |
| 2,157,649 | Eksergian | May 9, 1939 |
| 2,210,533 | Fisher et al. | Aug. 6, 1940 |
| 2,226,790 | Valletta | Dec. 31, 1940 |